(12) United States Patent
Mitani

(10) Patent No.: US 8,605,373 B2
(45) Date of Patent: Dec. 10, 2013

(54) LENS BARREL

(75) Inventor: Yoshifumi Mitani, Osaka (JP)

(73) Assignee: Konica Minolta Advanced Layers, Inc., Tokyo (JP)

( * ) Notice: Subject to any disclaimer, the term of this patent is extended or adjusted under 35 U.S.C. 154(b) by 0 days.

(21) Appl. No.: 13/580,231

(22) PCT Filed: Mar. 3, 2011

(86) PCT No.: PCT/JP2011/001257
§ 371 (c)(1),
(2), (4) Date: Aug. 21, 2012

(87) PCT Pub. No.: WO2011/111345
PCT Pub. Date: Sep. 15, 2011

(65) Prior Publication Data
US 2012/0314312 A1 Dec. 13, 2012

(30) Foreign Application Priority Data

Mar. 9, 2010 (JP) .................................. 2010-052047

(51) Int. Cl.
*G02B 7/02* (2006.01)
*G02B 15/14* (2006.01)
*G03B 17/00* (2006.01)

(52) U.S. Cl.
USPC ........... 359/823; 359/694; 359/696; 396/542; 396/535; 396/349; 348/208.4; 348/335; 348/360

(58) Field of Classification Search
USPC .............. 359/819, 823, 694–701; 348/208.4, 348/335, 360, 373, 374, E5.024, E5.027, 348/E5.028, E5.031, E5.046; 396/72, 79, 396/85, 87, 89, 144, 349, 448, 529, 535, 396/542, 544
See application file for complete search history.

(56) References Cited

U.S. PATENT DOCUMENTS

| | | | | |
|---|---|---|---|---|
| 4,804,331 A | * | 2/1989 | Eguchi et al. | 439/162 |
| 4,864,348 A | * | 9/1989 | Fujiwara et al. | 396/542 |
| 5,523,892 A | * | 6/1996 | Yoshibe et al. | 359/819 |
| 5,678,137 A | * | 10/1997 | Katayama et al. | 396/73 |
| 5,717,969 A | * | 2/1998 | Miyamoto et al. | 396/535 |

(Continued)

FOREIGN PATENT DOCUMENTS

| JP | 5-145228 A | 6/1993 |
|---|---|---|
| JP | 7-218804 A | 8/1995 |

(Continued)

OTHER PUBLICATIONS

International Search Report in PCT/JP2011/001257 dated Apr. 5, 2011, 2 pages.

*Primary Examiner* — Loha Ben
(74) *Attorney, Agent, or Firm* — Brinks Gilson & Lione

(57) ABSTRACT

An FPC (3) includes a first bending portion (31) having an outer periphery thereof directed from an attachment portion (36) toward an upstream end (3F), and bent in such a direction as to face the attachment portion (36); a second bending portion (32) which is bent from the attachment portion (36) toward a center axis (Z1) at a specified position closer to a downstream end (3B) than the first bending portion (31), and guided to a positioning portion (11); and a third bending portion (33) which is bent toward the camera body at a specified position closer to the downstream end (3B) than the positioning portion (11).

9 Claims, 7 Drawing Sheets

(56) References Cited

U.S. PATENT DOCUMENTS

| | | | |
|---|---|---|---|
| 5,809,361 A * | 9/1998 | Nomura et al. | 396/542 |
| 5,884,105 A * | 3/1999 | Nomura et al. | 396/72 |
| 6,493,511 B2 * | 12/2002 | Sato | 396/72 |
| 6,522,482 B2 * | 2/2003 | Nomura et al. | 359/701 |
| 6,597,518 B2 * | 7/2003 | Nomura et al. | 359/699 |
| 7,661,893 B2 | 2/2010 | Kureishi et al. | |
| 7,978,250 B2 * | 7/2011 | Miyoshi | 348/335 |
| 2006/0103756 A1 | 5/2006 | Shiozaki | |
| 2007/0092247 A1 | 4/2007 | Kureishi et al. | |

FOREIGN PATENT DOCUMENTS

| | | |
|---|---|---|
| JP | 9-211284 A | 8/1997 |
| JP | 2006-145704 A | 6/2006 |
| JP | 2006-313249 A | 11/2006 |
| JP | 2007-114529 A | 5/2007 |

* cited by examiner

LENS BARREL

TECHNICAL FIELD

The invention relates to a lens barrel constructed in such a manner that an electrical component disposed in the lens barrel is electrically connected to a camera body via a flexible printed circuit board.

BACKGROUND ART

In recent years, there is a demand for miniaturization of a lens barrel, in addition to high performance and high function. Seeking high performance results in an increase in the size of a lens and a driving portion for driving e.g. the lens. As a result, the size of the lens barrel is increased, which is against the demand for miniaturization. Seeking miniaturization of a lens barrel results in a decrease in the clearance between components, which makes it difficult to assemble the lens barrel.

Generally, a lens barrel is internally provided with electrical components, and the electrical components and a camera-body-side circuit board are electrically connected via a flexible printed circuit board (hereinafter, called as "FPC"). Since miniaturization of a lens barrel results in a decrease in the space for installing an FPC, disposing the FPC at an inappropriate position may cause interference between the FPC and a driving member during use of a camera, which may damage the FPC. Further, disposing the FPC at an inappropriate position may cause tearing of the FPC at the time of assembling the lens barrel, which may damage the FPC and result in operation failure of the lens barrel.

In particular, in most of the cases, a lens barrel incorporated in an exchange lens for a single-lens reflex camera is provided with an inner focus system, a lens system loaded with a motor, and a shake correction mechanism. In particular, in the case where an inner-focus system is employed in a large aperture lens, movable members are disposed on the image side. Consequently, electrical components are disposed on the object side, which increases the length of the FPC to be electrically connected to a camera-body-side component. Further, considering the connection workability between the FPC, and a lens mount incorporated with an electrical contact with the camera-body-side component, it is necessary to secure a sufficiently long length for the FPC, in view of the need of pulling out the FPC from the lens barrel. The disposed position of the FPC is important for accommodating the FPC of such a long size in the lens barrel, while avoiding interference with the movable members. In other words, it is required to dispose an FPC at such a position that secures easy assembling in a limited space.

As shown in FIG. 6, patent literature 1 discloses a lens barrel comprising a fixed cylinder 2000, and an attachment base plate 3000 which is formed at a position facing a side wall of the fixed cylinder 2000, with an electronic component group 1000 being mounted on the fixed cylinder 2000 side, wherein an FPC is folded two times and accommodated in a space between the attachment base plate 3000 and the side wall of the fixed cylinder 2000.

As shown in FIG. 7, patent literature 2 discloses a lens barrel constructed in such a manner that a support plate 5400 which is slidably movable relative to an optical axis direction, and an electrical component 4200*a* provided on the lower side of the support plate 5400 are connected to each other by an FPC 6500. In patent literature 2, the FPC 6500 has an end thereof mounted on the upper surface of the support plate 5400, is folded toward the lower side so that the FPC 6500 faces the lower surface of the support plate 5400, and then, is bent in a direction orthogonal to the support plate 5400, with the other end thereof being connected to the electrical component 4200*a*.

However, patent literature 1 merely discloses a technology that an FPC is folded two times to be accommodated, and fails to provide a countermeasure against contact between the FPC and the electronic component group 1000. Accordingly, the FPC may be damaged by the electronic component or by soldering for use in connecting the electronic component. Further, an erroneous operation may occur resulting from noise superimposed on an electrical signal. In the technology disclosed in patent literature 2, the FPC 6500 is attached to the upper surface of the support plate 5400, and is folded toward the lower side. Accordingly, a force may be exerted on the FPC 6500 in such a direction as to peel off the FPC 6500 from the support plate 5400. Long-time use of the lens barrel in such a condition may result in peeling off of the attachment portion of the FPC 6500, and interference with a member adjacent to the FPC 6500 at the time of operation, which may cause generation of abnormal sound or conduction failure.

CITATION LIST

Patent Literature
   Patent literature 1: JP Hei 5-145228A
   Patent literature 2: JP Hei 7-218804A

SUMMARY OF INVENTION

An object of the invention is to provide a lens barrel that enables to secure a certain length for an FPC for easy assembling, while avoiding contact between the FPC and a peripheral member of the FPC, and enables to prevent peeling off of the FPC at an attachment portion for stable mounting of the FPC.

A lens barrel according to an aspect of the invention is a lens barrel constructed in such a manner that an electrical component disposed in the lens barrel is electrically connected to a circuit board of a camera body. The lens barrel includes a fixed cylinder; a tubular movable member held on the fixed cylinder and adapted to move a lens group in an optical axis direction; an FPC having an upstream end thereof connected to the electrical component, and a downstream end thereof connected to the camera body; and an FPC fixing member disposed radially away from the movable member and adapted to fixedly mount the FPC. The fixed cylinder includes a positioning portion for passing the FPC therethrough and adapted to position the FPC. The FPC includes an attachment portion to be attached to a side wall of the FPC fixing member at a specified position closer to the downstream end than the upstream end, a first bending portion having an outer periphery thereof directed from the attachment portion toward the upstream end and bent in such a direction as to face the attachment portion, and a second bending portion bent in such a direction as to intersect the attachment portion at a specified position closer to the downstream end than the first bending portion, and guided to the positioning portion. The FPC is urged toward the object side at the positioning portion.

DESCRIPTION OF EMBODIMENTS

First Embodiment

Figure 1:
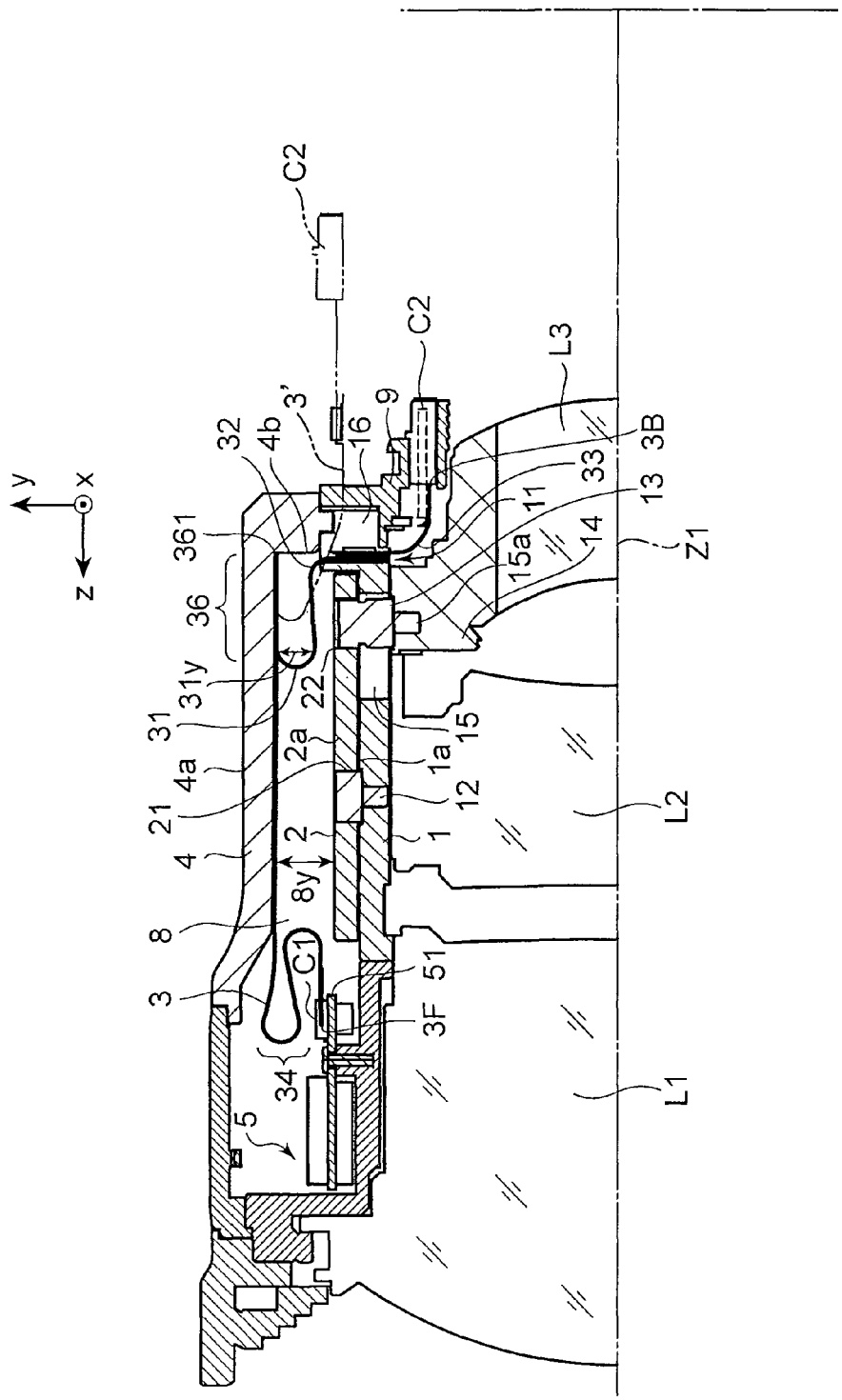
FIG. 1 is a partially sectional view of a lens barrel in an optical axis direction according to a first embodiment of the invention.

FIG. 1 is a partially sectional view of a lens barrel in an optical axis direction according to the first embodiment of the invention. In FIG. 1, z-direction denotes the optical axis direction, y-direction denotes a radial direction, and x-direction denotes a width direction. Further, plus z-direction side corresponds to an object side, minus z-direction side corresponds to a camera body side, plus y-direction side corresponds to a radially outer side, and minus y-direction side corresponds to a radially inner side.

As shown in FIG. 1, the lens barrel is provided with a tubular fixed cylinder 1 with a length direction thereof being aligned with the optical axis direction; a tubular movable member 2 which is provided coaxially with the fixed cylinder 1 and is contacted with a side wall 1a of the fixed cylinder 1; an electrical component 5 provided on the plus z-direction side of the fixed cylinder 1; and a tubular FPC fixing member 4 which is provided coaxially with the fixed cylinder 1 and is adapted to cover the outer periphery of the movable member 2.

Guide pins 12 projecting in the plus y-direction are provided on the side wall 1a of the fixed cylinder 1. A plurality (in this example, three) of the guide pins 12 are respectively provided at positions (in this example, at three equidistant positions) equidistantly away from each other in the outer periphery of the side wall 1a of the fixed cylinder 1, as viewed in the z-direction. The guide pins 12 are screw-connected to the fixed cylinder 1.

The movable member 2 is rotatably mounted on the fixed cylinder 1 about a center axis Z1. The minus y-direction side surface of a side wall 2a of the movable member 2 is contacted with the plus y-direction side surface of the side wall 1a of the fixed cylinder 1. Three oblong holes 21 are formed in the side wall 2a of the movable member 2 for respectively guiding the three guide pins 12. The oblong holes 21 have a length direction thereof aligned in a direction in parallel to the x-y plane. With this arrangement, the z-directional movement of the movable member 2 is restricted. The length direction of the oblong holes 21 may be slightly inclined with respect to the x-y plane. Further, oblong holes 22 are formed in the side wall 2a of the movable member 2 for moving guide pins 13 in the z-direction. The oblong holes 22 are cam grooves, and are inclined oblong holes extending in the rotating direction (x-direction), with the z-directional position thereof being changeable. A plurality (in this example, three) of the oblong holes 22 are formed at positions (in this example, at three equidistant positions) equidistantly away from each other in the side wall 2a of the movable member 2, as viewed in the z-direction.

A rear end of the fixed cylinder 1 is formed with oblong holes 15 communicating with the oblong holes 22 in a state that the z-direction along which a circumferential movement of the guide pins 13 is restricted is aligned with the length direction. The guide pins 13 are engaged in the oblong holes 22 and in the oblong holes 15, and a distal end 15a formed in the minus y-direction is engaged with a holding frame 14. The three guide pins 13 are provided in correspondence to the oblong holes 15, 22. Alternatively, plural sets of guide pins 12, 13, and oblong holes 15, 22 may be provided.

The holding frame 14 holds a movable lens group L3. When the movable member 2 is rotated relative to the fixed cylinder 1 about the center axis Z1, the guide pins 13 are moved in the z-direction along the oblong holes 22. Then, the holding frame 14 is moved in the z-direction in accordance with the movement of the guide pins 13, and the movable lens group L3 is moved in the z-direction in accordance with the movement of the holding frame 14. In other words, in the first embodiment, the movable lens group L3 is moved in the z-direction by rotating the movable member 2. A lens group L1 and a lens group L2 are immovable fixed lens groups.

The FPC fixing member 4 is mounted on the fixed cylinder 1, with a side wall 4a thereof away from the side wall 1a of the fixed cylinder 1 in the plus y-direction. With this arrangement, an FPC space 8 is formed between the side wall 2a of the movable member 2 and the side wall 4a of the FPC fixing member 4. In the first embodiment, the FPC fixing member 4 is mounted on the fixed cylinder 1 by using engaging members (not shown) such as screws, and serves as an outer mounting member for the lens barrel. Specifically, the engaging members are used for mounting the FPC fixing member 4 on the fixed cylinder 1 at a rear end 16 of the fixed cylinder 1, on an x-y plane obtained by cutting the lens barrel along a direction different from the direction shown in FIG. 1. A plurality (e.g. three) of the engaging members are provided at e.g. positions equidistantly away from each other in the outer periphery of the fixed cylinder 1, as viewed in the z-direction.

The electrical component 5 is mounted on the side wall 1a of the fixed cylinder 1 on the plus z-direction side of the movable member 2. The electrical component 5 includes a flat substrate 51 mounted on the plus y-direction side of the side wall 1a of the fixed cylinder 1. The substrate 51 is connected to a connector C1 mounted on an upstream end 3F of an FPC 3. With this arrangement, the FPC 3 and the electrical component 5 are electrically connected to each other. The electrical component 5 has e.g. a function for implementing autofocus control.

The FPC 3 has the upstream end 3F thereof connected to the connector C1, and a downstream end 3B thereof connected to a connector C2. The connector C2 is an electrical contact with a camera-body-side component. In the specification, the side on which the connector C1 is connected is called as the upstream end side of the FPC 3, and the side on which the connector C2 is connected is called as the downstream end side of the FPC 3.

The rear end of the fixed cylinder 1 is formed with a positioning portion 11 for passing the FPC 3 therethrough and for positioning the FPC 3. The positioning portion 11 is composed of a groove formed by cutting away the rear end 16 of the fixed cylinder 1 into a recess toward the plus z-direction side. An annular mount 9 is attached to the rear end 16 of the fixed cylinder 1 so that the camera body is mounted on the mount 9. The connector C2 is fixedly mounted on the mount 9. The mount 9 is provided coaxially with the fixed cylinder 1, and is screw-fixed to the fixed cylinder 1. The FPC fixing member 4 is screw-fixed to the fixed cylinder 1.

The FPC 3 is formed with an attachment portion 36 to which the FPC fixing member 4 is attached at a position closer to the lower end 3B than the connector C1. The attachment portion 36 has a rear end 361 thereof positioned to a boundary between the side wall 4a and a bottom wall 4b of the FPC fixing member 4, and the plus y-direction side surface of the attachment portion 36 is attached to the minus y-direction side surface (inner wall surface) of the side wall 4a of the FPC fixing member 4.

The FPC 3 is formed with a first bending portion 31 having an outer periphery thereof directed from the attachment portion 36 toward the plus z-direction side and bent in such a direction as to face the attachment portion 36. A y-directional length 31y of the first bending portion 31 is set shorter than a y-directional length 8y of the FPC space 8, and is set to such a value that the FPC 3 is not contacted with the movable member 2.

The FPC 3 is formed with a second bending portion 32 which is bent in a direction toward the inner side (center axis Z1) (e.g. in a direction orthogonal to the attachment portion 36; minus y-direction) of the lens barrel with respect to the attachment portion 36 at a specified position on the minus z-direction side (downstream end 3B side) than the first bending portion 31, and is guided to the positioning portion 11.

In other words, the FPC 3 is constructed in such a manner that the first bending portion 31 is folded at the attachment portion 36 in such a direction as to face the attachment portion 36, and then, the second bending portion 32 is bent at the attachment portion 36 in a direction toward the center axis Z1 for insertion into the positioning portion 11 formed in the side wall 1a of the fixed cylinder 1. As a result, a force is constantly acted on a portion of the FPC 3 upstream of the second bending portion 32 in a radially outward direction (toward the plus y-direction side). With this arrangement, even in the case where the movable member 2 extends to a position corresponding to the rear end of the fixed cylinder 1, there is no likelihood that the first bending portion 31 may be lowered, which may result in contact of the FPC 3 with the movable member 2. Thus, it is possible to prevent damage of the FPC 3 and operation failure of the movable member 2. Further, since the force is constantly acted on the FPC 3 in the radially outward direction (toward the plus y-direction side), there is no likelihood that a force may be exerted on the FPC 3 in such a direction as to peel off the FPC 3 from the attachment portion 36.

The FPC 3 is further formed with a third bending portion 33 bent toward the minus x-direction side at a specified position closer to the lower end 3B than the positioning portion 11.

Figure 2A:
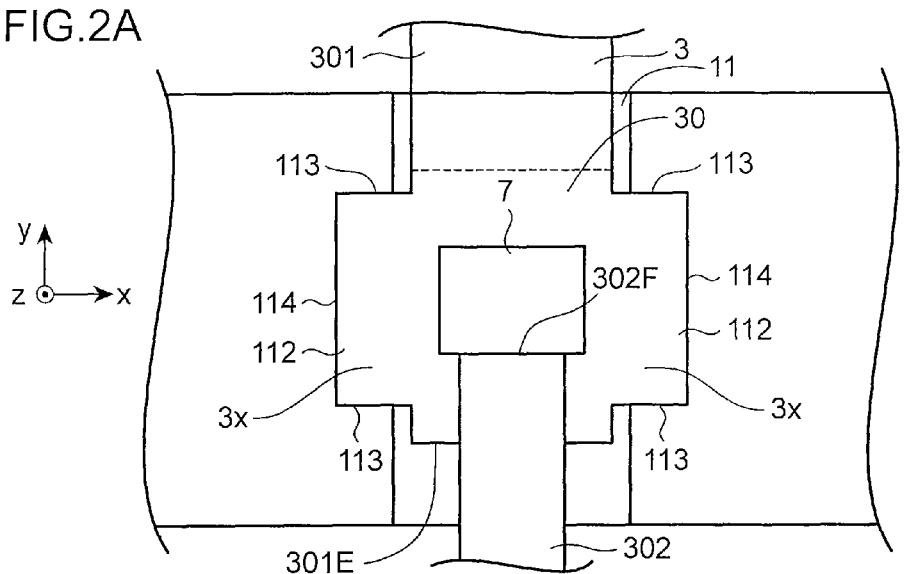
FIGS. 2A and 2B are diagrams for describing the relations between a positioning portion and an FPC.
Figure 2B:
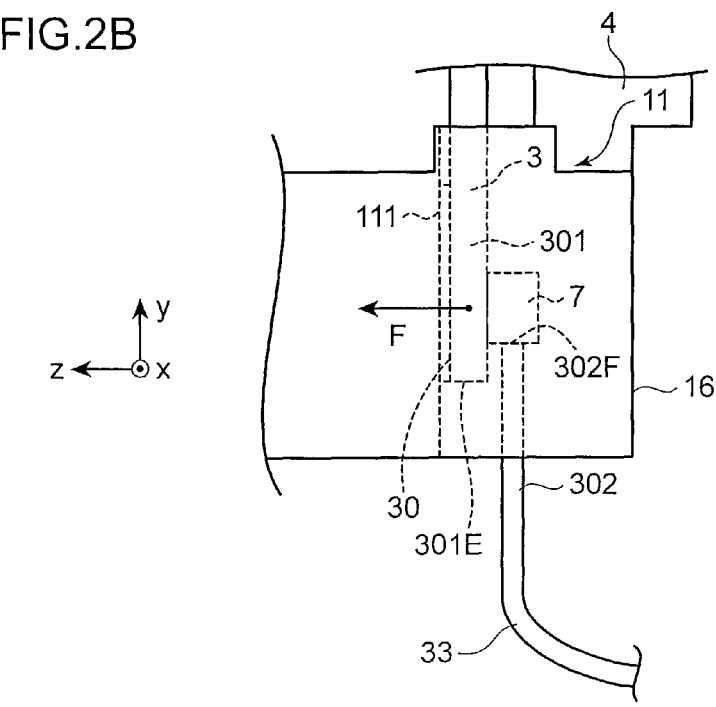

FIGS. 2A and 2B are diagrams for describing the relations between the positioning portion 11 and the FPC 3. FIG. 2A shows the FPC 3, as viewed from the rear end of the lens barrel (as viewed in the plus z-direction), and FIG. 2B shows the FPC 3, as viewed in the plus x-direction. As shown in FIG. 2A, the FPC 3 is formed with a pair of left and right projections 3x, 3x projecting in the x-direction.

A reinforcing member 30 is attached to the FPC 3 at a position corresponding to the area where the positioning portion 11 is formed. The area where the reinforcing member 30 is attached serves as a reinforcing area for reinforcing the FPC 3. In this example, the shape of the reinforcing member 30 is substantially the same as the shape of the FPC 3 within the positioning portion 11. An example of the reinforcing member 30 is a sheet of polyimide, which is the same material as for the FPC 3. Alternatively, a plastic sheet may be used as the reinforcing member 30.

The positioning portion 11 is formed with a pair of left and right recesses 112, 112 in the x-direction for engagement with the projections 3x, 3x.

Each of the recesses 112 has a pair of side portions in parallel to the x-direction, as first restricting portions 113, 113. Each of the recesses 112 has a side portion in parallel to the y-direction, as a second restricting portion 114. The FPC 3 has a y-directional movement thereof restricted by the first restricting portions 113, 113; and an x-directional movement thereof restricted by the second restricting portion 114.

In this example, the width of the positioning portion 11 in the plus y-direction and in the minus y-direction is set longer than the width of the FPC 3 with respect to the recesses 112, 112.

A connector 7 is provided at a middle portion of the reinforcing area where the reinforcing member 30 is attached. In the first embodiment, the FPC 3 is divided into an upstream-side FPC portion 301 located on the upstream end 3F side than the reinforcing area, and a downstream-side FPC portion 302 located on the downstream end 3B side than the reinforcing area.

A female portion of the connector 7 protrudes in the minus z-direction at a position slightly closer to the upstream end 3F than a downstream end 301E of the upstream-side FPC portion 301. A male portion of the connector 7 is formed at an upstream end 302F of the downstream-side FPC portion 302. Engaging the male portion in the female portion of the connector 7 electrically connects between the upstream-side FPC portion 301 and the downstream-side FPC portion 302.

As shown in FIG. 2B, the FPC 3 is formed with the third bending portion 33. With this arrangement, an elastic force F acting toward the object side is exerted on the FPC 3 at the position corresponding to the positioning portion 11. Application of the elastic force F resiliently urges the FPC 3 toward a bottom surface 111 of the positioning portion 11 on the plus z-direction side, whereby the FPC 3 is stably mounted on the fixed cylinder 1. Further, even if the projections 3x, 3x are not formed on the FPC 3, application of the elastic force F resiliently urges the FPC 3 toward the bottom surface 111 of the positioning portion 11 on the object side. Thus, it is possible to stably mount the FPC 3 on the fixed cylinder 1.

Specifically, in the case where the FPC 3 is not formed with the third bending portion 33, a force in the minus z-direction may be exerted on the positioning portion 11 due to the existence of e.g. the second bending portion 32, and the FPC 3 may be raised from the bottom surface 111 of the positioning portion 11. In such a case, it is impossible to stably mount the FPC 3 on the fixed cylinder 1. In view of this, forming the third bending portion 33 is advantageous in exerting the elastic force F on the FPC 3 for stably mounting the FPC 3 onto the fixed cylinder 1.

In the first embodiment, the third bending portion 33 is formed by bending the FPC 3 one time. Alternatively, the third bending portion 33 may be formed by bending the FPC 3 one time and then folding the FPC 3 one or more times. The number of times of bending (folding) the FPC 3 at the third bending portion 33 may be set depending on the length of the FPC 3 corresponding to the distance from the positioning portion 11 to the connector C2.

Figure 5:
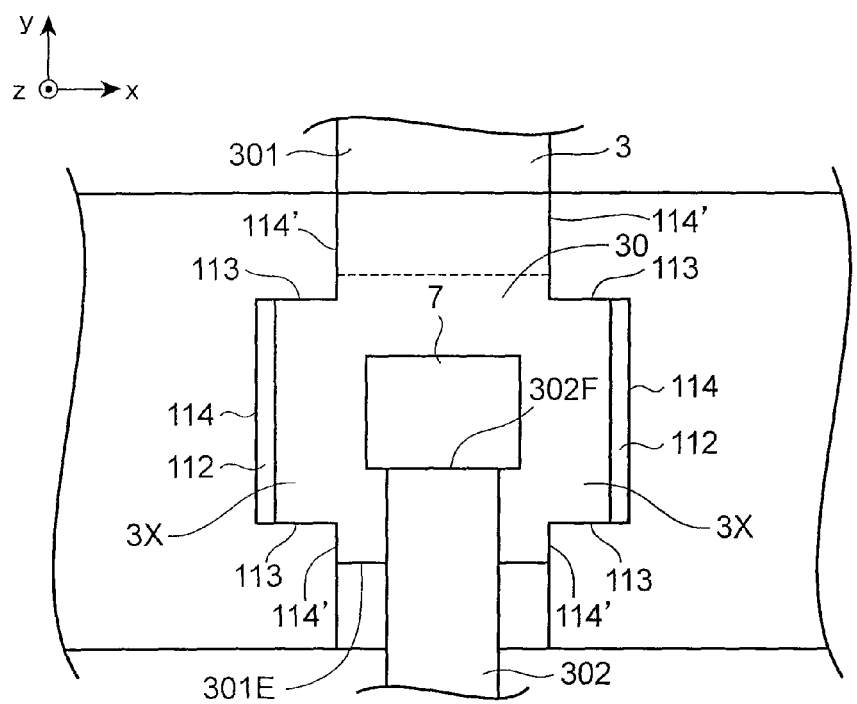
FIG. 5 is a diagram showing a modification of the lens barrel shown in FIG. 2.
Figure 6:
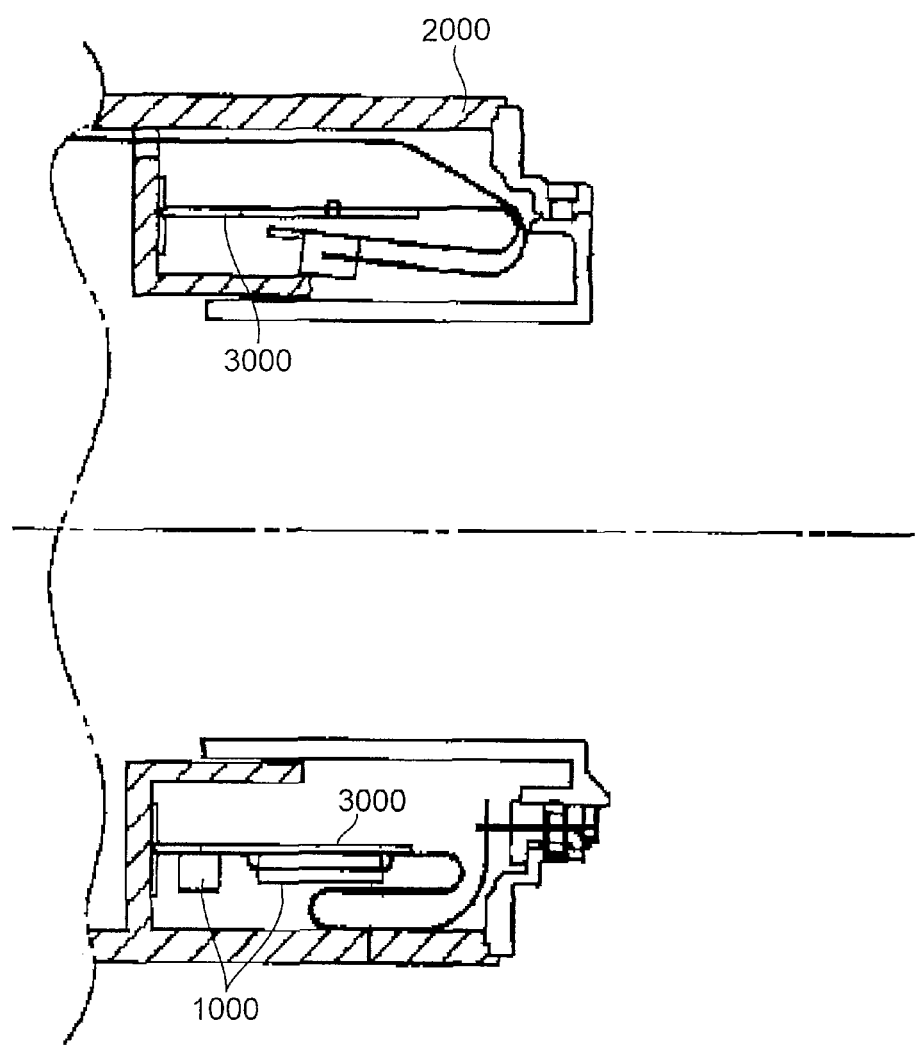
FIG. 6 is a partially sectional view of a conventional lens barrel in an optical axis direction.
Figure 7:
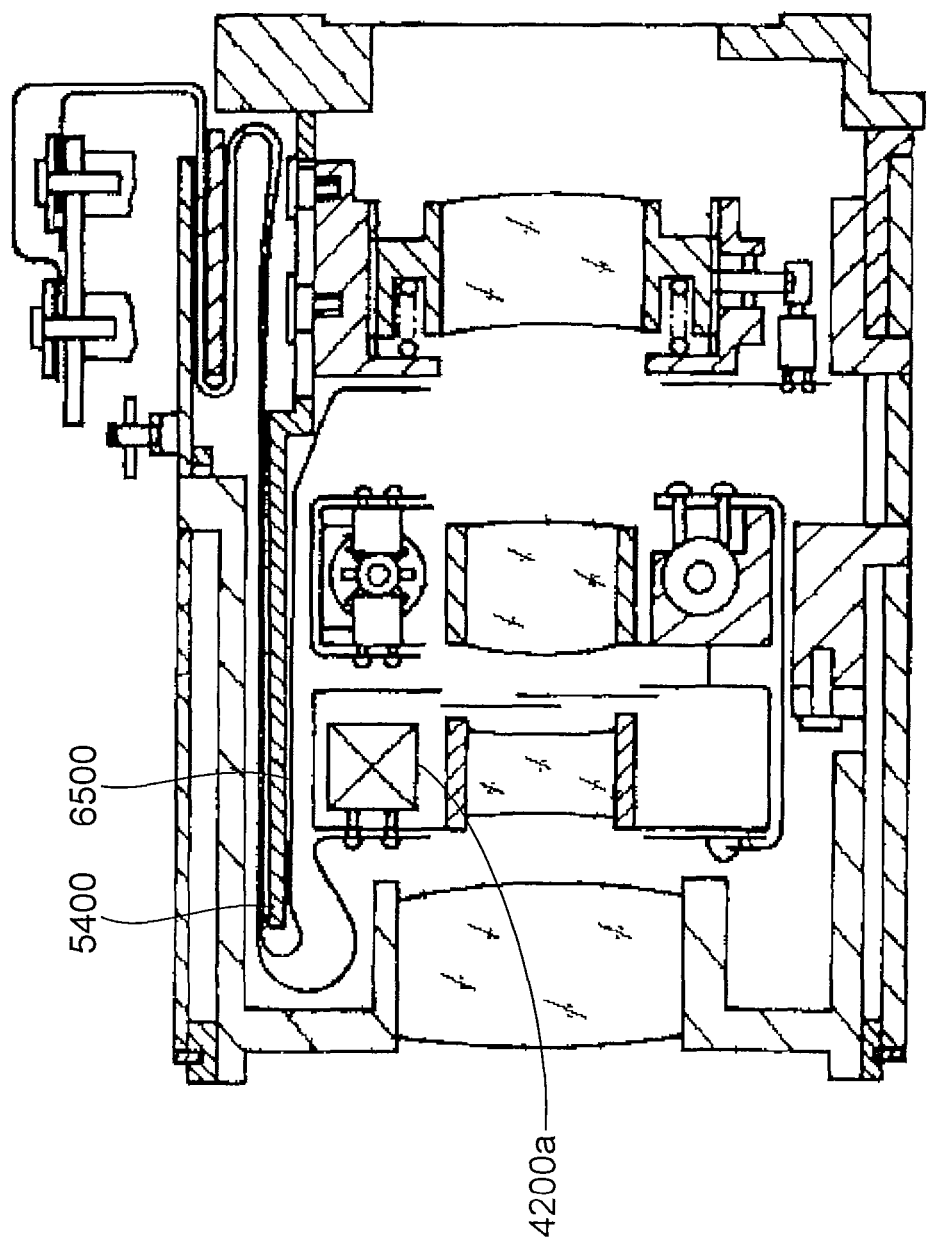
FIG. 7 is a partially sectional view of another conventional lens barrel in an optical axis direction.

Further alternatively, the arrangement shown in FIG. 5 may be adopted, in place of the arrangement shown in FIG. 2A. FIG. 5 is a diagram for describing the relations between a positioning portion 11 and an FPC 3, specifically, a diagram of the positioning portion 11, as viewed in the plus z-direction. In FIG. 2A, the two side portions of each of the projections 3x in parallel to the y-direction serve as the second restricting portions 114, 114. Alternatively, in FIG. 5, two side portions of each of projections 3x, 3x in parallel to the y-direction and formed on the plus y-direction side and on the minus y-direction side serve as second restricting portions 114' and 114'. In this example, the width of the positioning portion 11 between the second restricting portions 114' and 114' is set equal to the width of the FPC 3. With this arrangement, an x-directional movement of the FPC 3 is restricted. The width of the positioning portion 11 between the projections 3x and 3x is set shorter than the width of the positioning portion 11 between the second restricting portions 114 and 114.

Figure 3:
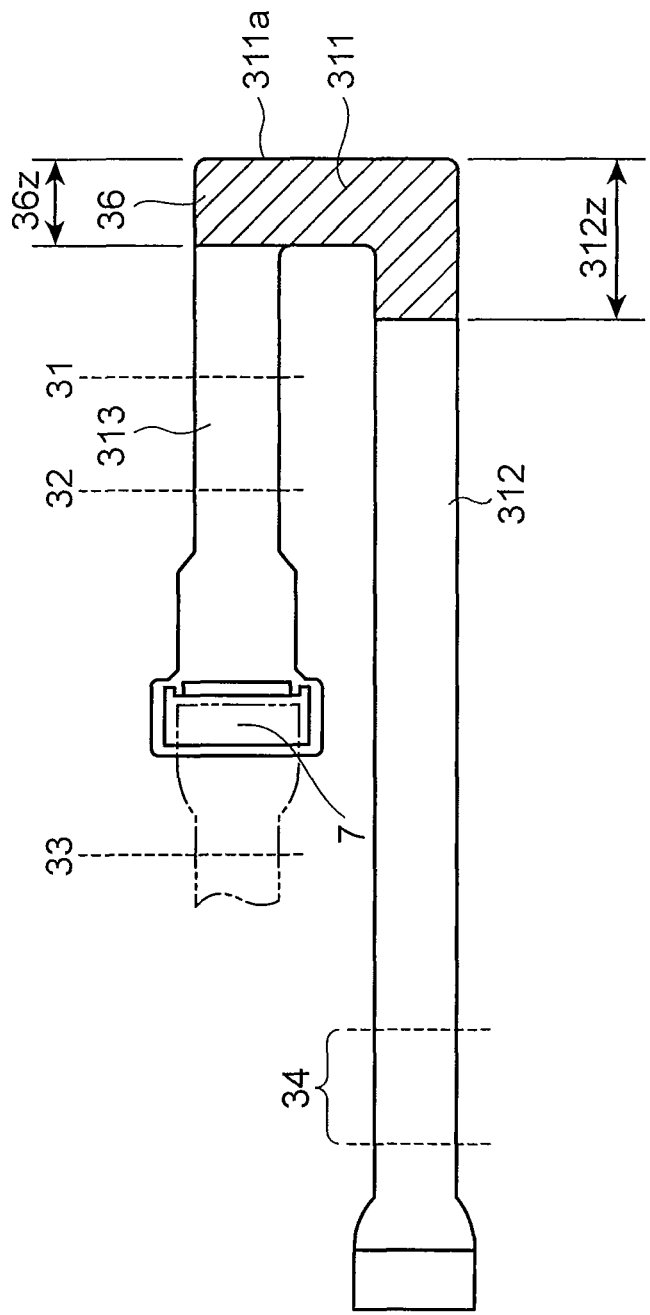
FIG. 3 is a developed view of the FPC.

FIG. 3 is a developed view of the FPC 3. The FPC 3 has a substantially U-shape in a developed view, and is composed of a bottom portion 311, a first branch portion 312, and a second branch portion 313. The first branch portion 312 extends from one end of the bottom portion 311, with a length direction thereof being orthogonal to the length direction of the bottom portion 311. The second branch portion 313 extends from the other end of the bottom portion 311, with a length direction thereof being orthogonal to the length direction of the bottom portion 311. An outer periphery 311a of the bottom portion 311 has a linear shape in parallel to the length direction of the bottom portion 311. The outer periphery 311a is positioned to the rear end 361 of the attachment portion 36.

The FPC 3 is attached to the FPC fixing member 4 in such a manner that the outer periphery 311a of the bottom portion 311 is positioned to the minus z-direction side end of the FPC fixing member 4, in other words, positioned to a boundary between the side wall 4a and the bottom wall 4b (rear end 361) of the FPC fixing member 4. With this arrangement, assuming that a z-directional length 36z of the attachment portion 36 is set to a fixed value, it is possible to set a start position of the first bending portion 31 to an intended position in the z-direction within the FPC space 8. This makes it possible to precisely mount the FPC on the fixed cylinder 1. Further, accurately setting the z-directional length 36z of the attachment portion 36 enables to automatically form the first bending portion 31 and the second bending portion 32 at the intended positions within the FPC space 8 by insertion of the second branch portion 313 into the positioning portion 11 and by engagement of the projections 3x into the recesses 112. This facilitates the operation of mounting the FPC 3 on the fixed cylinder 1.

The length 36z may be set equal to e.g. about a z-directional width of the bottom portion 311. In FIG. 3, the entire area of the bottom portion 311 serves as the attachment portion 36 shown in FIG. 1. This is merely an example. Alternatively, as shown in FIG. 3, the area of the first branch portion 312 having a length 312z from the outer periphery 311a may be included in the attachment portion 36.

The FPC 3 is formed with a fourth bending portion 34 bent (folded) on the upstream end side of the attachment area of the first branch portion 312 and at a specified position near the electric component 5. In the example shown in FIG. 1, the fourth bending portion 34 is folded two times. Alternatively, the fourth bending portion 34 may be folded one time, three times, four times, five times or more, as necessary, depending on the length of the FPC 3 on the upstream end side than the attachment area of the first branch portion 312.

Next, an assembling operation of the lens barrel is described referring to FIG. 1. Before the assembling is started, referring to FIG. 1, the FPC fixing member 4 and the mount 9 are detached from an internal unit including the fixed cylinder 1, the movable member 2, the substrate 51, and the lens groups L. In this state, the upstream-side FPC portion 301 and the downstream-side FPC portion 302 are not connected to each other.

Then, the upstream-side FPC portion 301 (the bottom portion 311 of the FPC portion 301) is attached to the attachment portion 36 of the FPC fixing member 4. Then, the connector C1 of the FPC 3 is connected to the substrate 51. Then, the internal unit is inserted in the inside of the FPC fixing member 4 while forming the fourth bending portion 34, and the FPC fixing member 4 is mounted on the rear end 16 of the fixed cylinder 1. In this state, the downstream end 301E of the upstream-side FPC portion 301 is raised from the positioning portion 11. Then, the downstream end 301E of the FPC 3 is pulled rearwardly so that the downstream-side FPC portion 302 connected to the connector C2 incorporated in the mount 9 is connected to the connector 7. In FIG. 1, a state that the FPC 3 is being mounted is shown by the two-dotted chain line, and a state that the FPC 3 has been pulled out is shown by the member indicated with the reference numeral 3'. Further, in the state that the FPC 3 is pulled out, the illustration of the mount 9 is omitted. Then, the first branch portion 312 is inserted into the space formed by the FPC fixing member 4 and the internal unit, and the projections 3x, 3x of the FPC 3 are engaged in the recesses 112, 112 of the positioning portion 11 (whereby the third bending portion 33 is formed), while forming the first bending portion 31 and the second bending portion 32. Lastly, the mount 9 is screw-fixed onto the fixed cylinder 1. Thus, the lens barrel shown in FIG. 1 is assembled.

Second Embodiment

Figure 4:
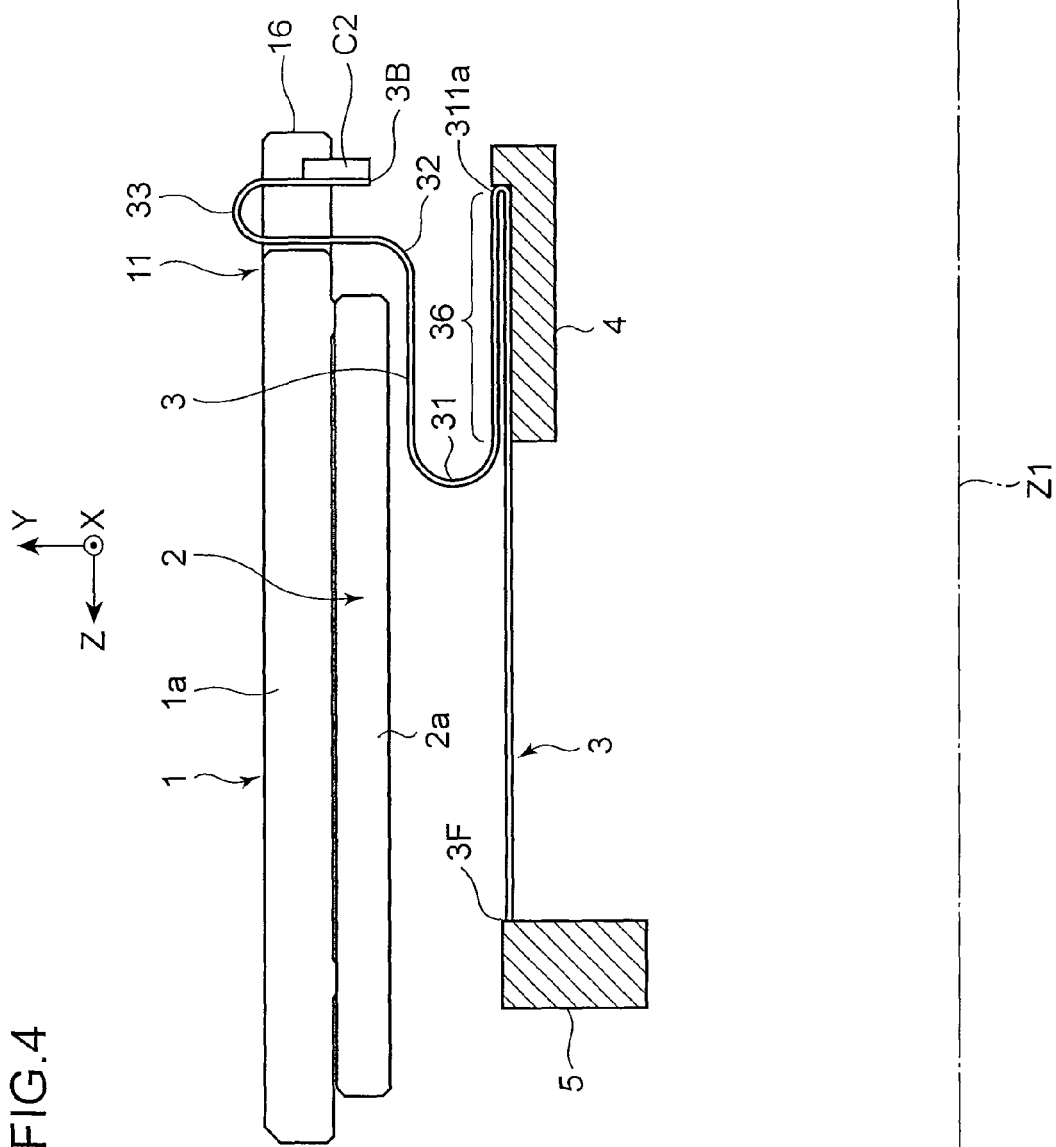
FIG. 4 is a sectional view partially showing a cross section of a lens barrel in an optical axis direction according to a second embodiment of the invention.

FIG. 4 is a sectional view partially showing a cross section of a lens barrel in an optical axis direction according to the second embodiment of the invention. The lens barrel is constructed in such a manner that the minus y-direction side surface of a side wall 1a of a fixed cylinder 1 is contacted with the plus y-direction side surface of a side wall 2a of a movable member 2. In the second embodiment, the movable member 2 holds a movable lens group L3 (not shown) via e.g. an unillustrated lens holder provided on the minus y-direction side, and moves the movable lens group L3 in the z-direction by moving in the z-direction. Further, in the second embodiment, an FPC fixing member 4 is disposed away from the movable member 2 on the minus y-direction side by a certain distance.

Alternatively, the movable lens group L3 may be moved in the z-direction by rotating the movable member 2 relative to the fixed cylinder 1 in the same manner as in the first embodiment. Further alternatively, an electrical component 5 and the FPC fixing member 4 may be moved in the z-direction, as the movable member 2 is moved.

An unillustrated outer mounting member is provided on the plus y-direction side of the fixed cylinder 1. The electrical component 5 is disposed on the minus y-direction side of the movable member 2, and on the plus z-direction side than the FPC fixing member 4. The FPC fixing member 4 is a tubular member disposed on the rear end side of the fixed cylinder 1 and on the radially inner side of the movable member 2.

An FPC 3 is attached to the outer periphery of the FPC fixing member 4. With this arrangement, an attachment portion 36 is formed on the FPC 3. In this example, the FPC 3 having such a developed shape as shown in FIG. 3 is adopted as the FPC 3. An outer periphery 311a of a bottom portion 311 is positioned to a rear end of the FPC fixing member 4. The minus z-direction side end of the movable member 2 is positioned slightly forward of the minus z-direction side end of the fixed cylinder 1, so that an area of the fixed cylinder 1 where a positioning portion 11 is formed is exposed. The positioning portion 11 is a groove formed by cutting away a rear end 16 of the fixed cylinder 1 in the same manner as in the first embodiment.

The lens barrel of the second embodiment is substantially the same as the lens barrel of the first embodiment in a point that the FPC 3 is folded at the attachment portion 36 from the first bending portion 31, and is bent in such a direction as to be orthogonal to the attachment portion 36 for passing the FPC 3 through the positioning portion 11 formed in the side wall 1*a* of the fixed cylinder 1. Further, the FPC 3 is bent toward the minus z-direction side so that the FPC 3 is folded back at a specified position on a downstream end 3B side than the positioning portion 11, and a connector C2 is connected to a circuit board of a camera body. In the second embodiment, similarly to the first embodiment, recesses 112, 112 may be formed in the positioning portion 11, and the FPC 3 may be formed with projections 3*x*, 3*x* for engagement between the FPC 3 and the projections 3*x*, 3*x*.

Since the first bending portion 31, the second bending portion 32, and the third bending portion 33 are formed in the second embodiment, it is possible to obtain substantially the same effect as in the first embodiment.

The following is a summary of the technical features of the lens barrel.

(1) The lens barrel is a lens barrel constructed in such a manner that an electrical component disposed in the lens barrel is electrically connected to a circuit board of a camera body. The lens barrel includes a fixed cylinder; a tubular movable member held on the fixed cylinder and adapted to move a lens group in an optical axis direction; an FPC having an upstream end thereof connected to the electrical component, and a downstream end thereof connected to the camera body; and an FPC fixing member disposed radially away from the movable member and adapted to fixedly mount the FPC. The fixed cylinder includes a positioning portion for passing the FPC therethrough and adapted to position the FPC. The FPC includes an attachment portion to be attached to a side wall of the FPC fixing member at a specified position closer to the downstream end than the upstream end, a first bending portion having an outer periphery thereof directed from the attachment portion toward the upstream end and bent in such a direction as to face the attachment portion, and a second bending portion bent in such a direction as to intersect the attachment portion at a specified position closer to the downstream end than the first bending portion, and guided to the positioning portion. The FPC is urged toward an object side at the positioning portion.

With the above arrangement, since the FPC is resiliently urged toward the object side at the positioning portion, it is possible to stably mount the fixed cylinder. Further, since a force for resiliently urging the FPC toward the object side is acted on the first bending portion and on the second bending portion at the positioning portion, it is possible to dispose the FPC away from the movable member.

Further, the FPC is constructed in such a manner that after the first bending portion is bent from the attachment portion in such a direction as to face the attachment portion, the second bending portion is bent in such a direction as to intersect the attachment portion for insertion into the positioning portion formed in the side wall of the fixed cylinder. Accordingly, even in the case where the movable member extends to the position corresponding to the rear end of the fixed cylinder, it is possible to prevent the first bending portion from spreading toward the movable member. This prevents contact of the FPC with the movable member and prevents damage of the FPC. Further, since the FPC is folded at the first bending portion in such a manner that the outer periphery of the first bending portion is directed toward the object side from the attachment portion, there is no likelihood that a force may be exerted on the FPC in such a direction as to peel off the FPC at the attachment portion. Thus, it is possible to prevent peeling off of the FPC.

Furthermore, passing the FPC from the side of the attachment portion through the positioning portion enables to form the first bending portion and the second bending portion. This eliminates the need of a bending operation, and is advantageous in shortening the time required for assembling, facilitating the assembling operation, and suppressing a variation in the bending operation of the FPC.

As described above, the lens barrel is advantageous in securing a certain length for the FPC for easy assembling, while avoiding contact of the FPC with a peripheral member of the FPC, and in preventing peeling off of the FPC at the attachment portion for stable mounting of the FPC.

(2) Preferably, the FPC may further include a third bending portion bent toward the camera body at a specified position closer to the downstream end than the positioning portion.

With the above arrangement, the FPC is bent toward the camera body at the third bending portion. Therefore, a force for resiliently urging the FPC toward the object side is acted on the FPC at the positioning portion.

(3) Preferably, the FPC may further include a pair of projections projecting in a width direction, and the positioning portion may include a pair of recesses for engagement with the projections.

With the above arrangement, the FPC is formed with the pair of projections. Further, the positioning portion of the fixed cylinder is formed with the pair of recesses for engagement with the projections. The FPC is mounted on the fixed cylinder by engagement of the paired projections into the paired recesses. This enables to suppress a variation of the FPC in the length direction while suppressing a variation of the FPC in the width direction. Thus, the above arrangement is advantageous in preventing rotation of the FPC, which may occur in the case of the conventional arrangement comprising: forming a hole in an FPC, letting a boss project from a positioning portion, and inserting the boss into the hole for fixing the FPC. Furthermore, forming a hole in an FPC requires to design a wiring pattern within the FPC in such a manner as to detour the hole. However, in the case where a projection is formed as described above, it is not necessary to form such a hole. Thus, the above arrangement eliminates the need of designing a wiring pattern within the FPC in such a manner as to detour a hole.

(4) Preferably, the FPC may be constructed in such a manner that a reinforcing member is attached to a portion of the FPC where the projections are formed.

With the above arrangement, since the FPC is reinforced by the reinforcing member at the position where the FPC is received in the positioning portion, it is possible to prevent damage of the FPC.

(5) Preferably, the FPC may be divided into an upstream-side FPC portion closer to the upstream end than a reinforcing area of the FPC where the reinforcing member is attached, and a downstream-side FPC portion closer to a downstream end of the reinforcing area, and the upstream-side FPC portion may further include a first connector to be electrically connected to the downstream-side FPC portion in the reinforcing area.

With the above arrangement, since the FPC is divided into the upstream-side FPC portion and the downstream-side FPC portion, and the upstream-side FPC portion and the downstream-side FPC portion are connected to each other via a connector, it is possible to enhance the assembling performance of the lens barrel. Further, since the connector is mounted at the reinforcing area, it is possible to prevent damage of the FPC resulting from a load of the connector.

(6) Preferably, the FPC fixing member may be an outer mounting member disposed on a radially outer side of the lens barrel than the movable member, and coupled to the fixed cylinder.

With the above arrangement, the FPC is accommodated in a space between the outer mounting member and the movable member. Thus, it is possible to mount a large aperture lens group in the inner space of the movable member, and to dispose the movable member at a position near the rear end of the fixed cylinder. With this arrangement, it is possible to provide a lens barrel adapted for an exchange lens for a single-lens reflex camera.

(7) Preferably, the FPC may further include a fourth bending portion bent on the upstream end side than the attachment portion, and at a position near the electrical component.

With the above arrangement, since the FPC is formed with the fourth bending portion which is bent at a position near the electrical component, it is possible to mount the FPC on the fixed cylinder without obstructing an operation of the movable member. Further, it is possible to secure a certain length for the FPC, which makes it easy to assemble the lens barrel.

(8) Preferably, the FPC may be formed into such a developed shape as to be composed of a bottom portion, a first branch portion extending from an end of the bottom portion, with a length direction thereof being orthogonal to a length direction of the bottom portion, and a second branch portion extending from an other end of the bottom portion, with a length direction thereof being orthogonal to the length direction of the bottom portion, and an outer periphery of the bottom portion may be positioned to a camera-body-side end of the FPC fixing member.

With the above arrangement, since the FPC can be attached to the FPC fixing cylinder in such a manner that the outer periphery of the bottom portion is located on the camera-body-side end of the FPC fixing cylinder, it is possible to prevent displacement of the FPC at the position where the first bending portion is formed.

(9) Preferably, the lens barrel may be a lens barrel for use in an exchange lens, the lens barrel may further include a mount to be attached to the camera body, and a second connector fixedly mounted on the mount for electrical connection with the camera body, and the FPC may be connected to the second connector.

With the above arrangement, it is possible to provide a lens barrel which is easy to be assembled, and suitable for an exchange lens for a single-lens reflex camera.

What is claimed is:

1. A lens barrel constructed in such a manner that an electrical component disposed in the lens barrel is electrically connected to a circuit board of a camera body, comprising:
    a fixed cylinder;
    a tubular movable member held on the fixed cylinder and adapted to move a lens group in an optical axis direction;
    an FPC having an upstream end thereof connected to the electrical component, and a downstream end thereof connected to the camera body; and
    an FPC fixing member disposed radially away from the movable member and adapted to fixedly mount the FPC, wherein:
    the fixed cylinder includes a positioning portion for passing the FPC therethrough and adapted to position the FPC; the FPC includes:
        an attachment portion to be attached to a side wall of the FPC fixing member at a specified position closer to the downstream end than the upstream end,
        a first bending portion having an outer periphery thereof directed from the attachment portion toward the upstream end and bent in such a direction as to face the attachment portion, and
        a second bending portion bent in such a direction as to intersect the attachment portion at a specified position closer to the downstream end than the first bending portion, and guided to the positioning portion; and wherein
    the FPC is urged toward an object side at the positioning portion.

2. The lens barrel according to claim 1, wherein
    the FPC further includes a third bending portion bent toward the camera body at a specified position closer to the downstream end than the positioning portion.

3. The lens barrel according to claim 2, wherein the FPC further includes a fourth bending portion bent at an area nearer to an upstream end side than the attachment portion, and at a position near the electrical component.

4. The lens barrel according to claim 1, wherein the FPC further includes a pair of projections projecting in a width direction, and the positioning portion includes a pair of recesses for engagement with the projections.

5. The lens barrel according to claim 4, wherein the FPC is constructed in such a manner that a reinforcing member is attached to a portion of the FPC where the projections are formed.

6. The lens barrel according to claim 5, wherein the FPC is divided into an upstream-side FPC portion closer to the upstream end than a reinforcing area of the FPC where the reinforcing member is attached, and a downstream-side FPC portion closer to a downstream end of the reinforcing area, and the upstream-side FPC portion further includes a first connector to be electrically connected to the downstream-side FPC portion in the reinforcing area.

7. The lens barrel according to claim 1, wherein the FPC fixing member is an outer mounting member disposed on a radially outer side of the lens barrel than the movable member, and coupled to the fixed cylinder.

8. The lens barrel according to claim 1, wherein the FPC is formed into such a developed shape as to be composed of a bottom portion, a first branch portion extending from an end of the bottom portion, with a length direction thereof being orthogonal to a length direction of the bottom portion, and a second branch portion extending from an other end of the bottom portion, with a length direction thereof being orthogonal to the length direction of the bottom portion, and wherein an outer periphery of the bottom portion is positioned to a camera-body-side end of the FPC fixing member.

9. The lens barrel according to claim 1, wherein;
    the lens barrel is a lens barrel for use in an exchange lens;
    the lens barrel further comprises:
    a mount to be attached to the camera body, and
    a second connector fixedly mounted on the mount for electrical connection with the camera body; and wherein
    the FPC is connected to the second connector.

* * * * *